United States Patent
Kim et al.

(10) Patent No.: US 9,710,912 B2
(45) Date of Patent: Jul. 18, 2017

(54) METHOD AND APPARATUS FOR OBTAINING 3D FACE MODEL USING PORTABLE CAMERA

(71) Applicant: Tricubics Inc., San Jose, CA (US)

(72) Inventors: Jong Min Kim, San Jose, CA (US); Sang Ki Lee, San Jose, CA (US); Man Soo Kim, San Jose, CA (US); Min Ho Ahn, San Jose, CA (US)

(73) Assignee: TRICUBICS INC., San Jose, CA (US)

( * ) Notice: Subject to any disclaimer, the term of this patent is extended or adjusted under 35 U.S.C. 154(b) by 361 days.

(21) Appl. No.: 14/481,019

(22) Filed: Sep. 9, 2014

(65) Prior Publication Data
US 2015/0279044 A1 Oct. 1, 2015

(30) Foreign Application Priority Data

Mar. 31, 2014 (KR) .................. 10-2014-0038194

(51) Int. Cl.
| | |
|---|---|
| *G06T 15/04* | (2011.01) |
| *G06T 7/00* | (2017.01) |
| *G06T 17/20* | (2006.01) |
| *G06K 9/00* | (2006.01) |
| *G06T 7/33* | (2017.01) |

(52) U.S. Cl.
CPC ........ *G06T 7/0065* (2013.01); *G06K 9/00214* (2013.01); *G06K 9/00268* (2013.01); *G06T 7/344* (2017.01); *G06T 15/04* (2013.01); *G06T 17/20* (2013.01); *G06T 2200/08* (2013.01); *G06T 2207/10028* (2013.01); *G06T 2207/30201* (2013.01)

(58) Field of Classification Search
CPC ..................................................... G06T 7/0065
See application file for complete search history.

(56) References Cited

U.S. PATENT DOCUMENTS

| | | | |
|---|---|---|---|
| 2009/0153553 A1* | 6/2009 | Kim ................. | G06T 17/20 345/419 |
| 2009/0153577 A1* | 6/2009 | Ghyme ............. | G06T 15/04 345/582 |
| 2014/0160123 A1* | 6/2014 | Yang ................ | G06T 17/00 345/420 |
| 2014/0194790 A1* | 7/2014 | Crunick ........... | A61H 23/0245 601/21 |
| 2014/0254892 A1* | 9/2014 | Park ................. | G06K 9/00288 382/118 |

* cited by examiner

*Primary Examiner* — Phi Hoang
(74) *Attorney, Agent, or Firm* — Martin & Ferraro, LLP

(57) ABSTRACT

An apparatus for obtaining a three-dimensional (3D) face model using a portable camera, comprising: a face image capturing unit; a face image processing unit; a 3D face mesh creating unit configured to analyze relationships of the face images to create a 3D user face mesh; a standard face model matching unit configured to match a 3D face standard model to the 3D face mesh created by the mesh creating unit to create a final high-quality user face model; a face skin texture synthesizing unit configured to create a face skin texture from the captured images; and a realistic face rendering unit configured to perform realistic rendering by using the user's high-quality 3D face model and the skin texture.

6 Claims, 4 Drawing Sheets
(2 of 4 Drawing Sheet(s) Filed in Color)

METHOD AND APPARATUS FOR OBTAINING 3D FACE MODEL USING PORTABLE CAMERA

CROSS-REFERENCE TO RELATED APPLICATIONS

This application is based on and claims priority from Korean Patent Application No. 10-2014-0038194, filed on Mar. 31, 2014, which is incorporated herein in its entirety by reference.

FIELD OF THE INVENTION

The present invention relates to a method and apparatus for creating a three-dimensional (3D) face model using a camera, and more particularly, to a method and apparatus for creating a high-quality, realistic 3D face model from a series of continuous images captured by a camera.

BACKGROUND OF THE INVENTION

Methods of creating a 3D face model using a camera include a method of using several synchronized cameras and a method of using a single camera. In the case of using several synchronized cameras, several high resolution cameras are disposed in fixed positions, and in this case, the cameras may include a depth camera, as well as a color camera. In this manner, several calibrated images are obtained using the cameras at a time to create a 3D face model.

With this method, since a face image may be obtained in a moment of time and already synchronized camera information is used, a 3D face model may be created within a short time. However, generally, high-priced equipment is required, and a large space is also required to dispose cameras in fixed positions, incurring high installation costs and having a limitation in costs and space for general users In order to create a 3D face model using a single camera, a face needs to be imaged several times to obtain one or more images. First, feature points (points near eyes, nose, and mouth) of a face are searched and correlations of the feature points are analyzed to obtain coordinates in a 3D space. Already created points corresponding to the 3D model are deformed to obtain a 3D face model of a user. However, the number of created feature points is merely tens of points, having a limitation in accurately restoring various face shapes of people to a level enabling virtual plastic surgery in three dimensions.

SUMMARY OF THE INVENTION

In view of the above, therefore, the present invention provides a method and apparatus for creating a high-quality, realistic 3D face model from a series of continuous images captured by a camera.

The technical problems of the invention are not restricted to those mentioned above, and other technical problems that are not mentioned herein will be apparently understood by those skilled in the art from the following description.

In accordance with one aspect of the invention, there is provided an apparatus for obtaining a three-dimensional (3D) face model using a portable camera, which includes: a face image capturing unit configured to capture user face images; a face image processing unit configured to extract a series of face images from the captured user face images; a 3D face mesh creating unit configured to analyze relationships of the face images to create a 3D user face mesh; a standard face model matching unit configured to match a 3D face standard model to the 3D face mesh created by the mesh creating unit to create a final high-quality user face model; a face skin texture synthesizing unit configured to create a face skin texture from the captured images; and a realistic face rendering unit configured to perform realistic rendering by using the user's high-quality 3D face model and the skin texture.

In the embodiment, wherein the face image capturing unit is configured to capture images of the user face depending on an image capture guide user interface (UI) by using a portable camera and store video and image sequences.

In the embodiment, wherein the face image processing unit is configured to select images from a set of transmitted continuous images at predetermined intervals to optimize processing performance and detect contour line portions of a face, the remaining portions of which are excluded from a post-processing target.

In the embodiment, wherein the 3D face mesh creating unit is configured to extract key points from the series of optimized images, analyze relationships between them to create a 3D point cloud, and connect points in a 3D space to create a 3D face mesh.

In the embodiment, wherein the standard face model matching unit is configured to match the 3D face mesh with a previously modeled high-quality standard model defining control points deformable with respect to a face to create a final high-quality face-deformable 3D face model.

In the embodiment, wherein the face skin texture synthesizing unit is configured to convert the 3D face model into a UV space and synthesize user images to create texture maps for face skin rendering.

In the embodiment, wherein the realistic face rendering unit is configured to map a face skin texture to the 3D face model and perform realistic face rendering by using a technique of simulating a skin effect.

In accordance with one aspect of the invention, there is provided a method for obtaining a three-dimensional (3D) face model through an apparatus for obtaining a 3D face model using a portable camera, which includes: capturing images of a user's face depending on an image capture guide user interface (UI) by using the portable camera; obtaining images from the captured images at specific frame intervals to detect face contour lines; recognizing key points from the pre-processed images and analyzing spatial relationships between them to generate a 3D point cloud; connecting points of 3D point clouds to create a 3D face mesh; matching a pre-stored 3D face standard model to the 3D face mesh created in the foregoing process to model a smoothing high-quality 3D face model; and synthesizing user face images to create texture maps for mapping with the 3D face model.

In the embodiment, wherein, in the capturing, with the user's face remained still, images of the user's face are captured by moving a camera from a left side of the face to a right side of the face or by moving the camera from the right side of the face to the left side of the face, or with the camera fixed, images of the user's face are captured by rotating the face from the left side to the right side or by rotating the face from the right side to the left side.

In the embodiment, wherein, in the obtaining, the least images are selected at predetermined intervals from the video or the set of continuous images delivered in the face image capturing process, face contour lines are extracted through an algorithm for extracting face contour lines from the corresponding images, and mask processing is then performed to exclude the remaining regions from a processing target.

In the embodiment, wherein, in the recognizing, key points are extracted from the face images delivered in the image processing process, corresponding key points are searched from adjacent images and connected, a structure of the key points of the images is analyzed by applying an Sfm algorithm utilizing factorization, whereby camera attributes, e.g., a focal length, an angle, and the like are obtained from the captured images, and based on such information, coordinate values in a 3D space with respect to the key points are created by applying triangulation to the key points.

In the embodiment, wherein, in the connecting, an additional point cloud is created by utilizing an optical flow technique, and a 3D mesh is then created by applying triangulation to the created dense point cloud to a dense point cloud.

In the embodiment, wherein, in the matching, landmarks are set in the 3D face mesh created in the foregoing process by using landmarks of a pre-stored high-quality 3D standard model, two models are aligned by utilizing an iterative closest points (ICP) algorithm based on the corresponding landmarks, and thereafter, the landmarks of the 3D face standard model are first changed to landmarks of the 3D face mesh in position, and the remaining vertices of the 3D face standard model are then matched to vertices of the 3D face mesh through nonlinear deformation.

In the embodiment, wherein, in the synthesizing, the created 3D face model is mapped to a UV space, pixel values of the images of the user corresponding to UV coordinates are searched to create a user face skin color texture map, and thereafter, for realistic rendering, an additional texture map such as a normal map, or a specular map is created by using a normal vector, a light source position, and the like, with respect to the created color map and the created 3D face model.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects and features of the present invention will become apparent from the following description of embodiments, given in conjunction with the accompanying drawings, in which.

DETAILED DESCRIPTION OF THE EMBODIMENT

Figure 1:
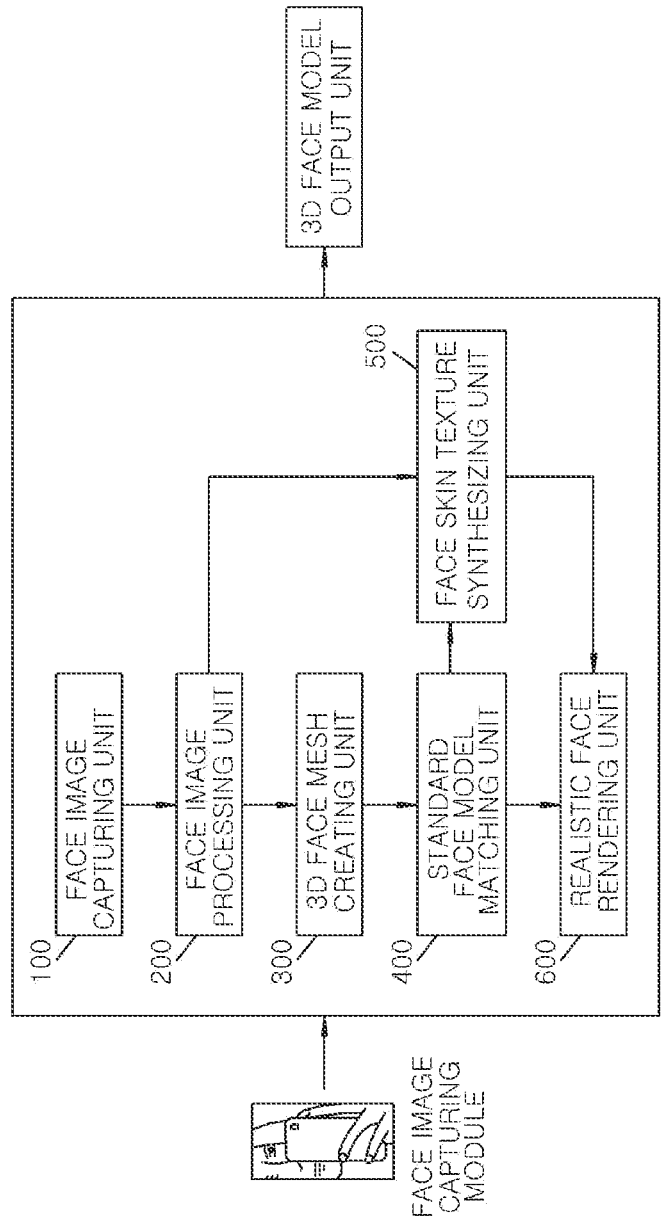
FIG. 1 is a view illustrating an apparatus for obtaining a 3D face model using a portable camera in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in more detail with the accompanying drawings. In the following description, in order to facilitate a full understating of the invention, like reference numerals are used for identical or similar elements in the drawings, and repeated descriptions therefor will be omitted.

FIG. 1 is a view illustrating an apparatus for obtaining a 3D face model using a portable camera in accordance with an embodiment of the present invention.

Referring to FIG. 1, the apparatus for obtaining a 3D face model using a portable camera in accordance with an embodiment of the present invention includes a face image capturing unit 100, a face image processing unit 200, a 3D face mesh creating unit 300, a standard face model matching unit 400, a face skin texture synthesizing unit 500, and a realistic face rendering unit 600.

The face image capturing unit 100 captures an image of a user's face using a portable camera. Here, in order to obtain images appropriate for post-processing, a user interface (UI) for an image capturing guide is provided. Thereafter, in order to optimize post-processing performance, the face image processing unit 200 selects images from a set of transmitted continuous images at predetermined intervals and detects contour line portions of a face, the remaining portions of which will be excluded from a post-processing target.

Then, the 3D face mesh creating unit 300 extracts key points from the series of optimized images, analyzes relationships therebetween to create a 3D point cloud, and connects points in a 3D space to create a 3D face mesh.

Thereafter, the standard face model matching unit 400 matches the 3D face mesh with a previously modeled high-quality standard model defining control points deformable with respect to a face to create a final high-quality face-deformable 3D face model. Then, the face skin texture synthesizing unit 500 converts the 3D face model into a UV space and synthesizes user images to create texture maps for face skin rendering. Subsequently, the realistic face rendering unit 600 maps a face skin texture to the 3D face model and performs realistic face rendering by using a technique of simulating a skin effect.

Figure 2:
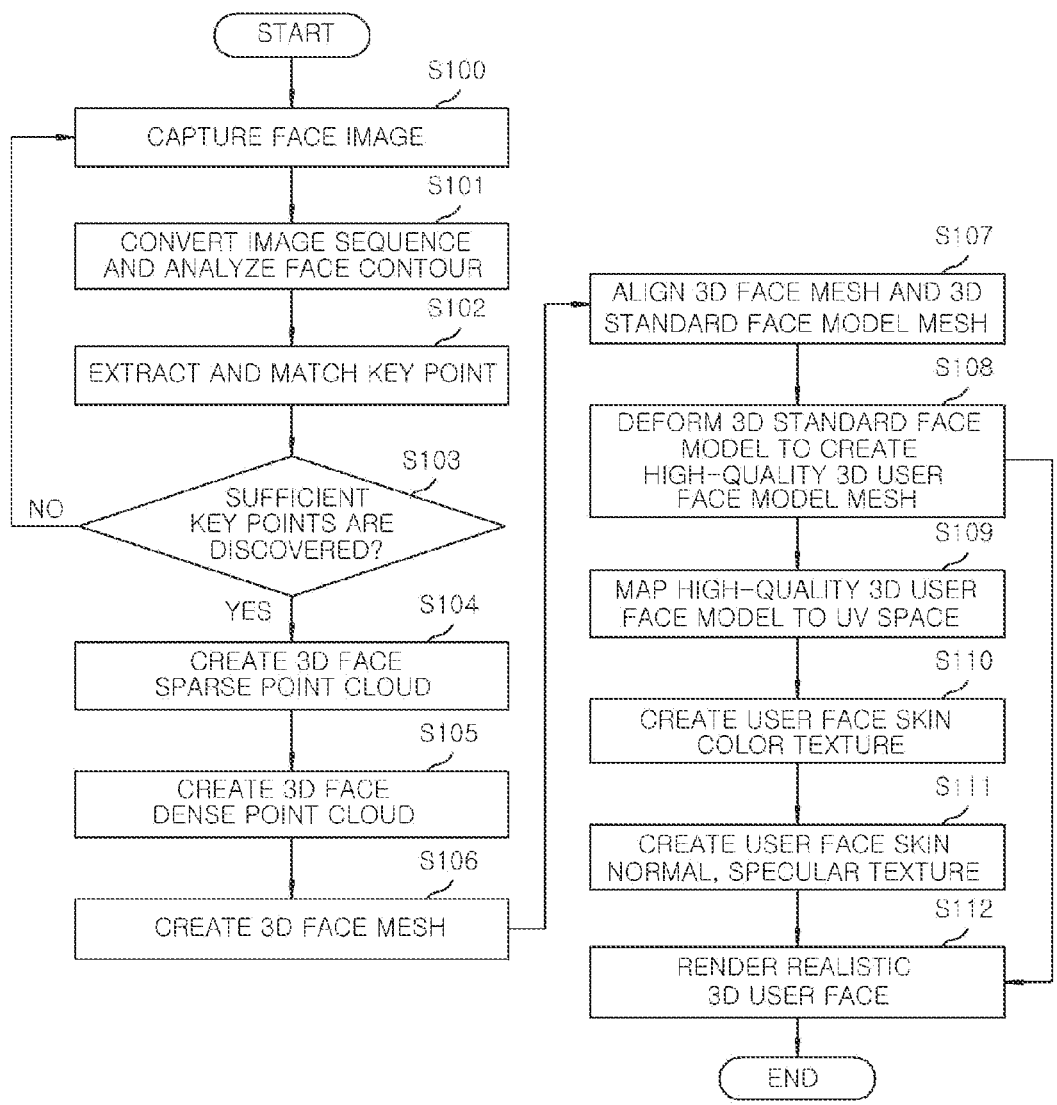
FIG. 2 is a flow chart illustrating a process of obtaining a 3D face model using a portable camera in accordance with an embodiment of the present invention.

FIG. 2 is a flow chart illustrating a method of obtaining a 3D face model using a portable camera in accordance with an embodiment of the present invention.

Referring to FIG. 2, in accordance with an embodiment of the present invention, with a user's face remained still, images of the user's face are captured by moving a camera from a left side of the face to a right side of the face or by moving the camera from the right side of the face to the left side of the face, or with the camera fixed, images of the user's face are captured by rotating the face from the left side to the right side or by rotating the face from the right side to the left side in step S100. Here, the captured images may be compressed and stored as a video or may be stored in the form of continuous images.

Thereafter, the least images are selected at predetermined intervals from the video or the set of continuous images delivered in the face image capturing process, face contour lines are extracted through an algorithm for extracting face contour lines from the corresponding images, and mask processing is then performed to exclude the remaining regions from a processing target in step S101.

Subsequently, key points are extracted from the face images delivered in the image processing process, and corresponding key points are searched from adjacent images and connected in step S102. Here, an algorithm of extracting key points from the images and connecting key points of the images to map them may be referred to in known technique [1](see [1] Stefan Leutenegger, Margarita Chli and Roland Siegwart, "BRISK: Binary Robust Invariant Scalable Keypoints", Proceedings of the IEEE International Conference on Computer Vision, 2011).

Thereafter, it is checked whether key points sufficient for creating a 3D mesh have been created in step S103. If sufficient key points have not been created, the user may be requested to capture images again. Then, directions in which key points move, a distance over which the key points have moved, a speed of movement of the key points, and the like may be obtained from the images by applying an Sfm algorithm utilizing factorization by using the mapped key points, whereby camera attributes, i.e., a focal length, an angle, and the like may be obtained from the captured images. Based on such information, coordinate values in a 3D space may be created by applying triangulation to the key points in step S104. Through this process, a sparse point cloud of the 3D face may be created.

Thereafter, since it is difficult to create a 3D mesh with the sparse point cloud created in the foregoing process, in order to obtain a dense point cloud, an additional point cloud is created by utilizing an optical flow technique to create a dense point cloud in step S105.

Subsequently, a 3D mesh is created by applying triangulation to the dense point cloud created in the foregoing process in step S106.

The 3D face mesh so created may have a hole or an irregular mesh may be created due to noise. Also, a shape of the mesh may be irregular to make it difficult to deform the mesh. Thus, in the present invention, a separate high-quality 3D standard face model that may be deformable and has major feature points of a face set in advance is stored in advance and matched to the created mesh to create a final 3D user face model.

To this end, landmarks are set in the 3D face mesh created in the foregoing process by using landmarks of the 3D standard model, and two models are aligned by utilizing an iterative closest points (ICP) algorithm based on the corresponding landmarks in step S107. Thereafter, the landmarks of the 3D face standard model are first changed to landmarks of the 3D face mesh in position, and the remaining vertices of the 3D face standard model are then matched to vertices of the 3D face mesh through nonlinear deformation in step S108. A specific algorithm of such matching may be implemented with reference to [2](see [2] David C. Schneider, and Peter Eisert, "Algorithms For Automatic And Robust Registration Of 3D Head Scans. JVRB—Journal of Virtual Reality and Broadcasting" 2010).

Thereafter, the created 3D face model is mapped to a UV space in step S109, and pixel values of the images of the user corresponding to UV coordinates are searched to create a user face skin color texture map in step S110. Then, for realistic rendering, an additional texture map such as a normal map, or a specular map may be created by using a normal vector, a light source position, and the like, with respect to the created color map and the created 3D face model in step S111. Subsequently, a skin reflection model (subsurface scattering) is simulated by utilizing the completed 3D face model and the automatically created skin texture maps in step S112.

Figure 3:
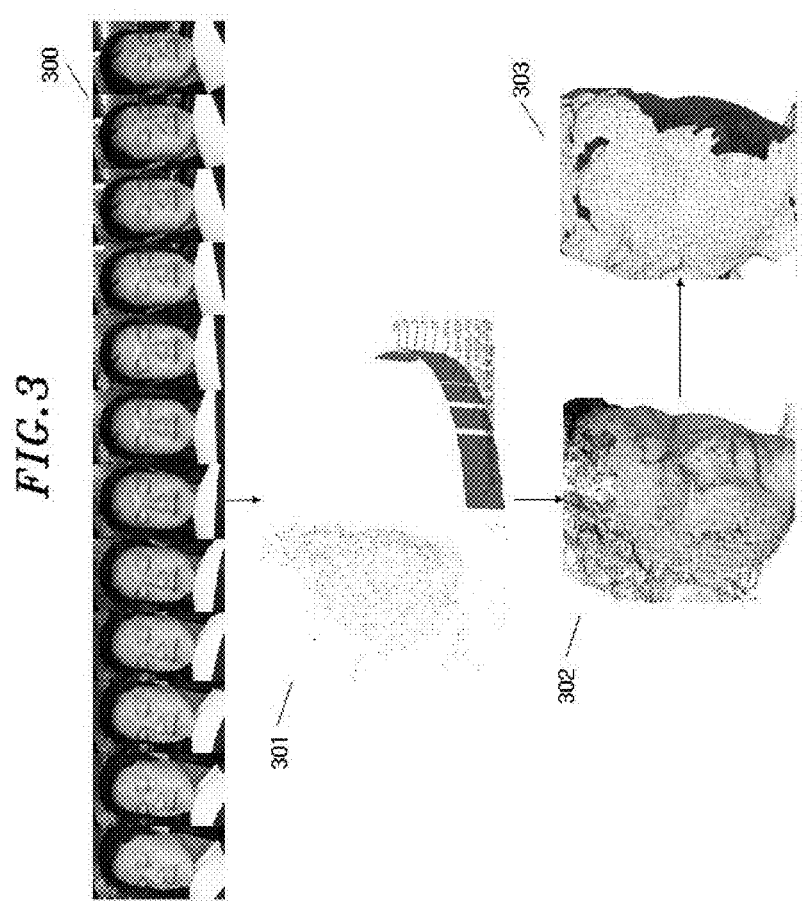
FIG. 3 is a view illustrating intermediate results of 3D face mesh restored from a series of face images obtained by a portable camera in accordance with an embodiment of the present invention.

FIG. 3 is a view illustrating intermediate results of 3D face mesh restored from a series of face images obtained by a portable camera in accordance with an embodiment of the present invention.

Referring to FIG. 3, 300 in accordance with an embodiment of the present invention denotes continuous images used to obtain a 3D model from images captured by the user, 301 denotes sparse cloud points created in step S104 of FIG. 2 and corresponding camera position information. Further, 302 denotes dense cloud points obtained by performing step S105 of FIG. 2 and 303 denotes a 3D face mesh obtained by performing step S106 of FIG. 2.

Figure 4:
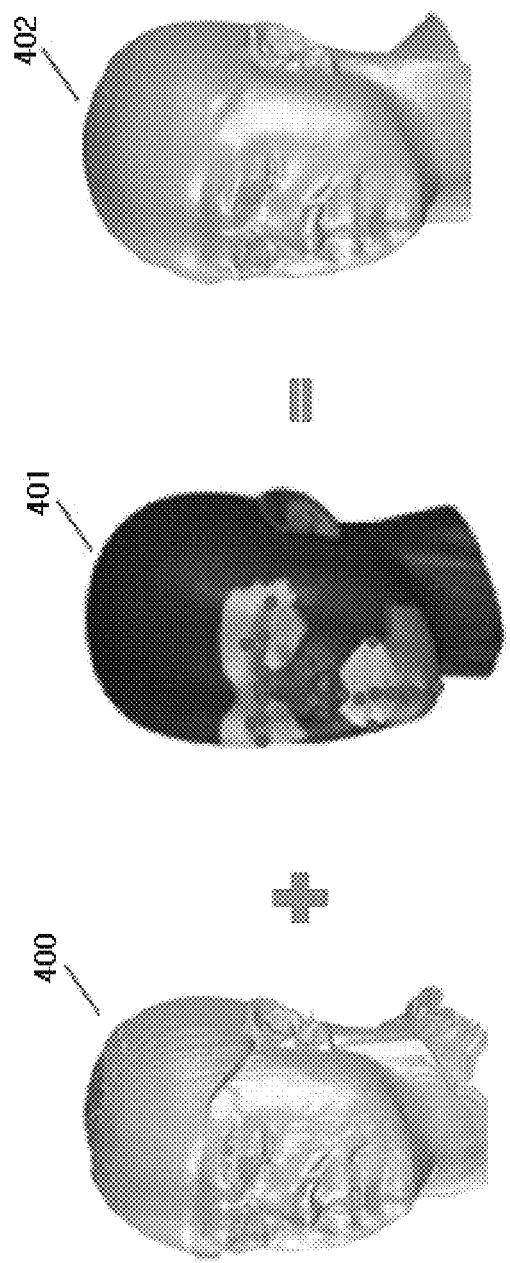
FIG. 4 is a view illustrating a 3D face standard model and a final 3D face model created by matching the 3D face standard model in accordance with an embodiment of the present invention.

FIG. 4 is a view illustrating a 3D face standard model and a final 3D face model created by matching the 3D face standard model in accordance with an embodiment of the present invention.

Referring to FIG. 4, 401 in accordance with an embodiment of the present invention denotes a previously created 3D face standard model. The previously created 3D face standard model has landmarks used to match with the 3D face mesh of 400 created in the 3D face mesh creating process, and is also structuralized to divide a face into regions and control the divided regions so as to be easily deformed. Accordingly, the final 3D face model 402 matched through the steps S107 and S108 of FIG. 2 may have a mesh structure identical to that of the 3D face standard model, and thus, it can be easily deformed.

In accordance with the method and apparatus for obtaining a 3D face model using a portable camera as described above, an individual can easily model a 3D face of a user at lost costs by using a portable camera such as a smart phone or a DSLR camera without using special-purpose scanner equipment or a separate high-priced camera and without having to visit a location where the corresponding equipment is installed.

Further, in accordance with the embodiments of the present invention, a high quality, realistic 3D model can be obtained, rather than creating a low-quality 3D face used in characters of games or avatars in a cyber space only by utilizing a limited number of feature points of an imaged face.

In addition, in accordance with the embodiments of the present invention, since a high-quality 3D user face is secured at low costs, a realistic virtual plastic surgery service can be more easily provided. Also, since various face-related virtual simulation services, such as a service of virtually wearing accessories such as glasses and earrings, a virtual hair styling service, or a 3D skin makeup service, are provided by utilizing 3D face models of users, a related industry can be greatly developed.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for obtaining a three-dimensional (3D) face model through an apparatus for obtaining the 3D face model using a portable camera, comprising:
   capturing images of a user's face depending on an image capture guide user interface (UI) by using the portable camera;
   obtaining images from the captured images of the user's face at specific frame intervals to detect face contour lines;
   recognizing key points from the obtained images and analyzing spatial relationships between the obtained images to generate a 3D point cloud;
   connecting points of the 3D point cloud to create a 3D face mesh;
   matching a pre-stored 3D face standard model to the 3D face mesh to model a smoothing high-quality 3D face model; and
   synthesizing the obtained images of the user's face to create texture maps for mapping with the 3D face model,
   wherein, in the matching, landmarks are set in the 3D face mesh by using landmarks of the pre-stored 3D face standard model, the pre-stored 3D face standard model and the 3D face mesh are aligned by utilizing an iterative closest points (ICP) algorithm based on corresponding landmarks, and thereafter, the landmarks of the pre-stored 3D face standard model are first changed to landmarks of the 3D face mesh in position, and remaining vertices of the pre-stored 3D face standard model are then matched to vertices of the 3D face mesh through nonlinear deformation.

2. The method of claim 1, wherein, in the capturing, with the user's face remained still, the images of the user's face are captured by moving the portable camera from a left side of the user's face to a right side of the user's face or by moving the portable camera from the right side of the user's face to the left side of the user's face, or with the portable camera fixed, the images of the user's face are captured by rotating the user's face from the left side to the right side or by rotating the user's face from the right side to the left side.

3. The method of claim 1, wherein, in the obtaining the images from the captured images of the user's face, the least images are selected at predetermined intervals from a video or a set of continuous images delivered in the capturing, the face contour lines are extracted through an algorithm for extracting the face contour lines from corresponding images, and a mask processing is then performed to exclude the remaining regions from a processing target.

4. The method of claim 1, wherein, in the recognizing, the key points are extracted from the obtained images, corresponding key points are searched from adjacent images and connected, a structure of the key points of the obtained images is analyzed by applying a Structure from motion (Sfm) algorithm utilizing factorization, whereby camera attributes are obtained from the captured images of the user's face, and coordinate values in a 3D space with respect to the key points are created by applying triangulation to the key points.

5. The method of claim 1, wherein, in the connecting, an additional point cloud is created by utilizing an optical flow technique, and the 3D mesh is then created by applying triangulation to the additional point cloud to a dense point cloud.

6. The method of claim 1, wherein, in the synthesizing, the 3D face model is mapped to a UV space, pixel values of the images of the user's face corresponding to UV coordinates are searched to create a user face skin color texture map, and thereafter, for realistic rendering, an additional texture map such as a normal map or a specular map is created by using a normal vector and a light source position with respect to the user face skin color texture map and the 3D face model.

* * * * *